March 31, 1959   B. BARÉNYI   2,880,032
VEHICLE BODY COMPOSED OF AN UPPER AND A LOWER SECTION
Original Filed Jan. 20, 1950   2 Sheets-Sheet 1

Inventor
Béla Barényi
By Dicke and Padlon
Attorneys

March 31, 1959  B. BARÉNYI  2,880,032

VEHICLE BODY COMPOSED OF AN UPPER AND A LOWER SECTION

Original Filed Jan. 20, 1950  2 Sheets-Sheet 2

Inventor
Béla Barényi
By
Dicke and Padlon
Attorneys

United States Patent Office 2,880,032
Patented Mar. 31, 1959

2,880,032

VEHICLE BODY COMPOSED OF AN UPPER AND A LOWER SECTION

Béla Barényi, Stuttgart-Rohr, Germany

Original application January 20, 1950, Serial No. 139,607. Divided and this application February 16, 1955, Serial No. 491,262

Claims priority, application Germany January 22, 1949

3 Claims. (Cl. 296—28)

This invention relates to a vehicle body composed of an upper and a lower section and relates more particularly to the center section or cell of a motor vehicle manufactured in sections or cells according to the cellular system of manufacture.

It is an object of the present invention to provide a motor vehicle in which the vehicle body is formed in two sections, so that the number of structural members and costs connected with tooling up, necessary for connecting the upper and lower sections, may be greatly reduced, to thereby substantially economize in the manufacture of vehicle bodies, especially when simultaneously employing the cellular system of manufacture. It is a further object of the present invention to reduce the number of replacement parts which necessarily must be kept in stock.

Accordingly a general object of the present invention is to make the connection of the front-end cell with the center cell interchangeable, or essentially interchangeable similar to the connection of the rear-end cell with the center cell.

This application is a division of applicant's abandoned application Serial No. 139,607, filed January 20, 1950.

In the vehicle body according to the present invention, the subdivision or connection of the upper and lower sections of the vehicle body is appropriately accomplished along the end walls of a center cell forming the front or rear panels of the body interior. The joint, formed by subdividing or connecting the two sections, may be arranged either along the upper edges of the end panels or along the lower edges thereof, or also in such a manner that one of the two sections, for example, the upper section on three sides embraces the ends belonging, for example, to the lower section. The connection may be detachable or non-detachable, and the joints may be welded, trussed or screwed together, folded, inserted or the like.

Further objects, features and advantages of the present invention will become more obvious from the following description when taken in connection with the accompanying drawing which shows for purposes of illustration only, several preferred embodiments in accordance with the preesnt invention, and wherein.

Figure 1:
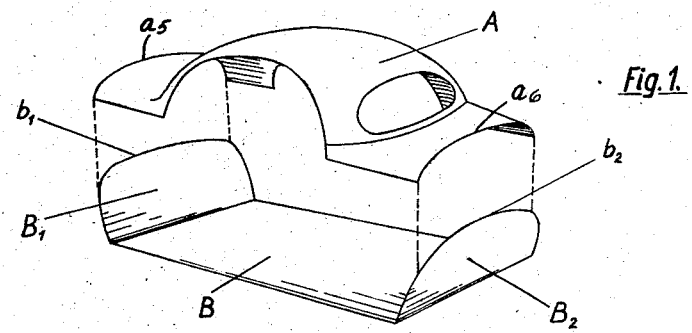
Figure 1 is a perspective view of a vehicle body in accordance with the present invention.

In Figures 1 to 11 of the drawing attached to the specification herein and forming part thereof several forms of vehicle bodies, in which the present invention is embodied, are illustrated schematically by way of example. The body, in each case, consists of an upper section and a lower section which are connected interchangeably alike in a forward joint and a rear joint both at the same height.

In Fig. 1 the upper and lower sections are welded together along the upper edge $b_1$ of the front panel $B_1$ and along the upper edge $b_2$ of the rear panel $B_2$ of the lower section.

Figure 2:
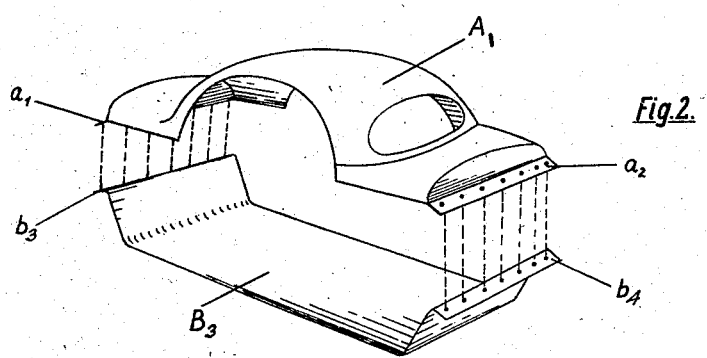
Figure 2 is a perspective view of a different embodiment of a vehicle body in accordance with the present invention.

In Fig. 2 the upper section $A_1$ and lower section $B_3$ are screwed or spot welded together along the horizontal flanges $b_3$ and $b_4$ of the lower section respectively and along the horizontal flanges $a_1$ and $a_2$ of the upper section.

Figure 3:
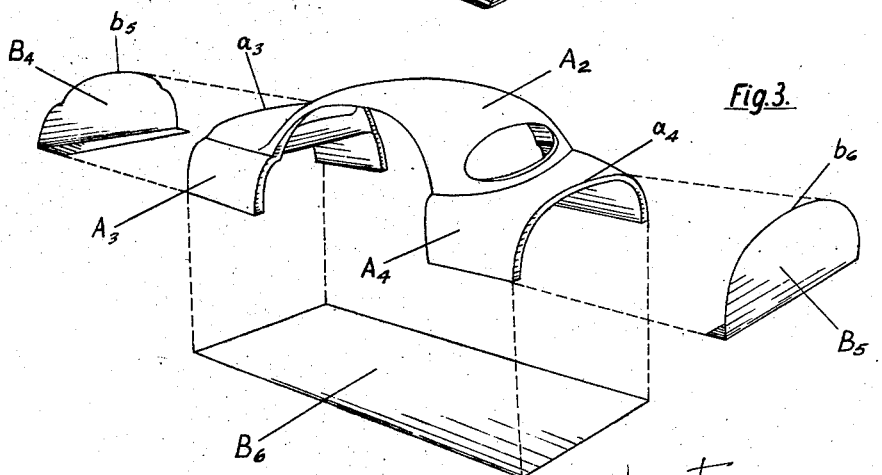
Figure 3 is an exploded perspective view of still another embodiment of a vehicle body in accordance with the present invention.

In Fig. 3 the upper section $A_2$ with its front end $A_3$ and its rear end $A_4$ embraces the front end $B_4$ and $B_5$ respectively of the lower section in such a manner that the connecting edges $a_3$ and $a_4$ of the upper section and the connecting edges $b_5$ and $b_6$ of the lower section are semi-circular or similarly formed. The end pieces $B_4$ and $B_5$ are separately made panels and are secured to the body floor, thereby forming the lower section of the vehicle body as a unitary structure. In the assembled relationship of sections $A_2$ and $B_6$, edges $a_3$, $b_5$ and $a_4$, $b_6$ constitute seams therebetween which follow and are necessarily limited by such edges, two of these, $b_5$ and $b_6$ enclosing respectively the front end $B_4$ and the rear end $B_5$.

In each of the aforementioned embodiments of Figures 1 to 3, the upper and lower edges or flanges $a_5$, $a_2$, $b_1$, $b_2$ of Fig. 1; $a_1$, $a_2$, $b_3$, $b_4$ of Fig. 2; and $a_3$, $a_4$, $b_5$, $b_6$ of Fig. 3 form the front and rear joints previously referred to upon assembly and connection of the various parts.

Figure 4:
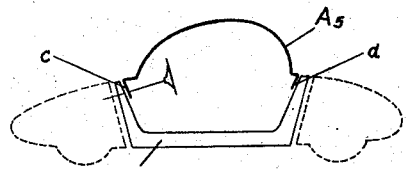
Figures 4 to 11 are schematic views of different embodiments in accordance with the present invention.
Figure 5:
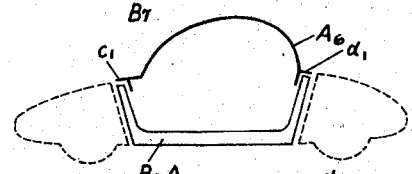
Figure 6:
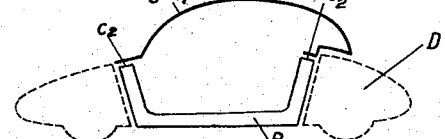

In Fig. 4 the upper section $A_5$ is provided with downwardly bent flanges which at $c$ and $d$ are inserted between the upper edges of the lower section $B_7$. In Fig. 5, the upper and lower sections $A_6$ and $B_8$ are connected by the simultaneous use of vertically and horizontally arranged flanges $c_1$ and $d_1$. The upper section $A_7$ in Fig. 6 is flange-connected at $c_2$ and $d_2$ and is extended over the rear section D of the vehicle, whereas in Fig. 7 the upper section $A_8$ is composed of part $A_9$ and part $A_{10}$ and the lower section of floor $B_{10}$ and inclined end panels $B_{11}$ and $B_{12}$, with flanged connections as shown at $c_3$ and $d_3$.

Figure 8:
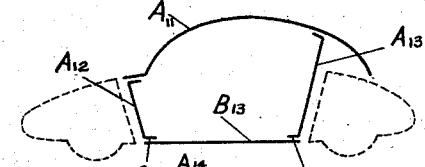

In the embodiment illustrated in Fig. 8, provision is made for similar connections $c_4$ and $d_4$ to the lower section $B_{13}$ forming in this case just the floor, whereas the upper section $A_{11}$ has additional panels $A_{12}$ and $A_{13}$ secured thereto.

Figure 9:
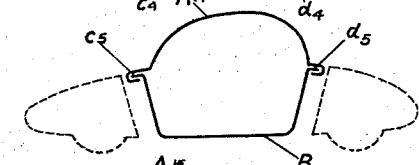
Figure 10:
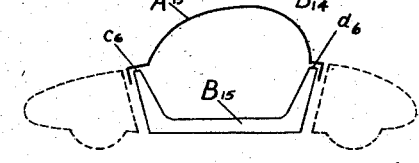

Fig. 9 illustrates a connection of the upper section $A_{14}$ with the lower section $B_{14}$ in which the edges to be joined are united by means of folding or beading as shown at $c_5$ and $d_5$, whereas in the embodiment according to Fig. 10 the upper section $A_{15}$ with its downwardly bent flanges extends at $c_6$ and $d_6$ over the upper edges of the lower section $B_{15}$.

Figure 11:
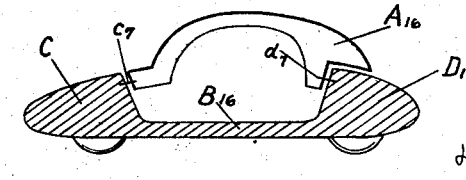

In Fig. 11 a further form of body construction is shown which, in contrast to the hereinbefore described embodiments, relates to a vehicle whose lower section $B_{16}$ also comprises the front section C and the rear section $D_1$ of the vehicle. The upper section $A_{16}$ being inserted from above is joined interchangeably alike at $c_7$ and $d_7$ to the lower section $B_{16}$ by welding, bolting or similar connections.

Instead of providing screwed, welded, or similar connections for securing the upper and lower sections along the joints $c$ and $d$, the connections thereof may also be accomplished at other locations, for example, by means of a central transverse girder, while the separating joints or surfaces $c$ and $d$ merely serve as trussing or abutment surfaces along which the two parts are sprung against each other without any other connections.

Figure 7:
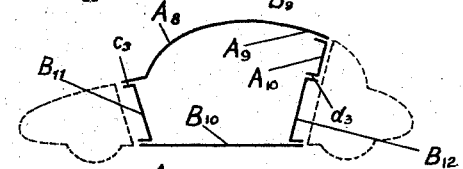

The embodiments according to Figures 5 and 10 or also those according to Figures 6 through 8 are particularly suitable for such an arrangement in which the transverse girder is inserted between the upper section A and lower section B or in which such a trussed or sprung connection is provided between the joints c and d. In addition to the detachable connection of the upper and lower section at these joints c and d, other connections may also be provided whereby the two parts A and B are trussed or sprung against each other.

It will be obvious to those who are familiar with such matters that the details of constructions may be varied from those shown by me and yet the essentials of the invention be retained, I therefore do not limit myself to such details.

What I claim is:

1. In a passenger motor vehicle having a front end compartment, a central compartment and a rear end compartment, a vehicle body for said central compartment comprising an upper section and a lower section, transverse front and rear walls on said upper section, transverse front and rear walls on said lower section, two joints comprising first joint members on said upper section and second joint members on said lower section, said first joint members and said second joint members being of identical shape, said first joint members being in abutting relationship with said second joint members, means urging said first and second joint members into said abutting relationship, and said two joints being located at substantially the same height on said vehicle body.

2. A vehicle body according to claim 1, wherein said first joint members and said second joint members are in offset relationship to said front and rear walls.

3. A vehicle body according to claim 1 wherein said joints extend in rectilinear directions.

References Cited in the file of this patent

UNITED STATES PATENTS

| | | |
|---|---|---|
| 2,128,930 | Fageol et al. | Sept. 6, 1938 |
| 2,192,535 | Snell | Mar. 5, 1940 |
| 2,556,062 | Buehrig | June 5, 1951 |
| 2,702,206 | Barenyi | Feb. 15, 1955 |

FOREIGN PATENTS

| | | |
|---|---|---|
| 940,185 | France | May 10, 1948 |

OTHER REFERENCES

Ser. No. 368,684, Barenyi et al. (A.P.C.), published May 25, 1943.